United States Patent
Zeng et al.

(10) Patent No.: US 12,536,233 B1
(45) Date of Patent: Jan. 27, 2026

(54) AI-GENERATED CONTENT PAGE TAILORED TO A SPECIFIC USER

(71) Applicant: Google LLC, Mountain View, CA (US)

(72) Inventors: Caren Zeng, Brooklyn, NY (US); Rushil Grover, San Jose, CA (US); Timothy Benjamin Whalin, Seattle, WA (US); Lauren Marjorie Bedford, Lake Forest Park, WA (US); Pallavi Satyan, Menlo Park, CA (US); Ethan Milo Mann, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/009,708

(22) Filed: Jan. 3, 2025

Related U.S. Application Data

(60) Provisional application No. 63/675,726, filed on Jul. 25, 2024.

(51) Int. Cl.
*G06F 16/00* (2019.01)
*G06F 16/9038* (2019.01)

(52) U.S. Cl.
CPC ............... *G06F 16/9038* (2019.01)

(58) Field of Classification Search
CPC .................................. G06F 16/9038
See application file for complete search history.

(56) References Cited

U.S. PATENT DOCUMENTS

2025/0086246 A1\* 3/2025 Varanasi ............... G06N 20/00

\* cited by examiner

*Primary Examiner* — Ajith Jacob
(74) *Attorney, Agent, or Firm* — DORITY & MANNING P.A.

(57) ABSTRACT

Techniques for generating an artificial intelligence (AI)-generated page for a first organization. The system can include a machine-learned model configured to generate the AI-generated page. The system can receive from a user device associated with a user account, the user query. Additionally, the system can generate a search result page for the user query. The search result page can include a first result associated with a first landing page of the first organization. The system can calculate a landing page score for the first landing page. The system can generate an updated search result page based on the landing page score exceeding a threshold value, the updated search result page having a navigation link to an AI-generated page for the first organization. The system can cause a presentation, on a display of the user device, the updated search result page.

20 Claims, 17 Drawing Sheets

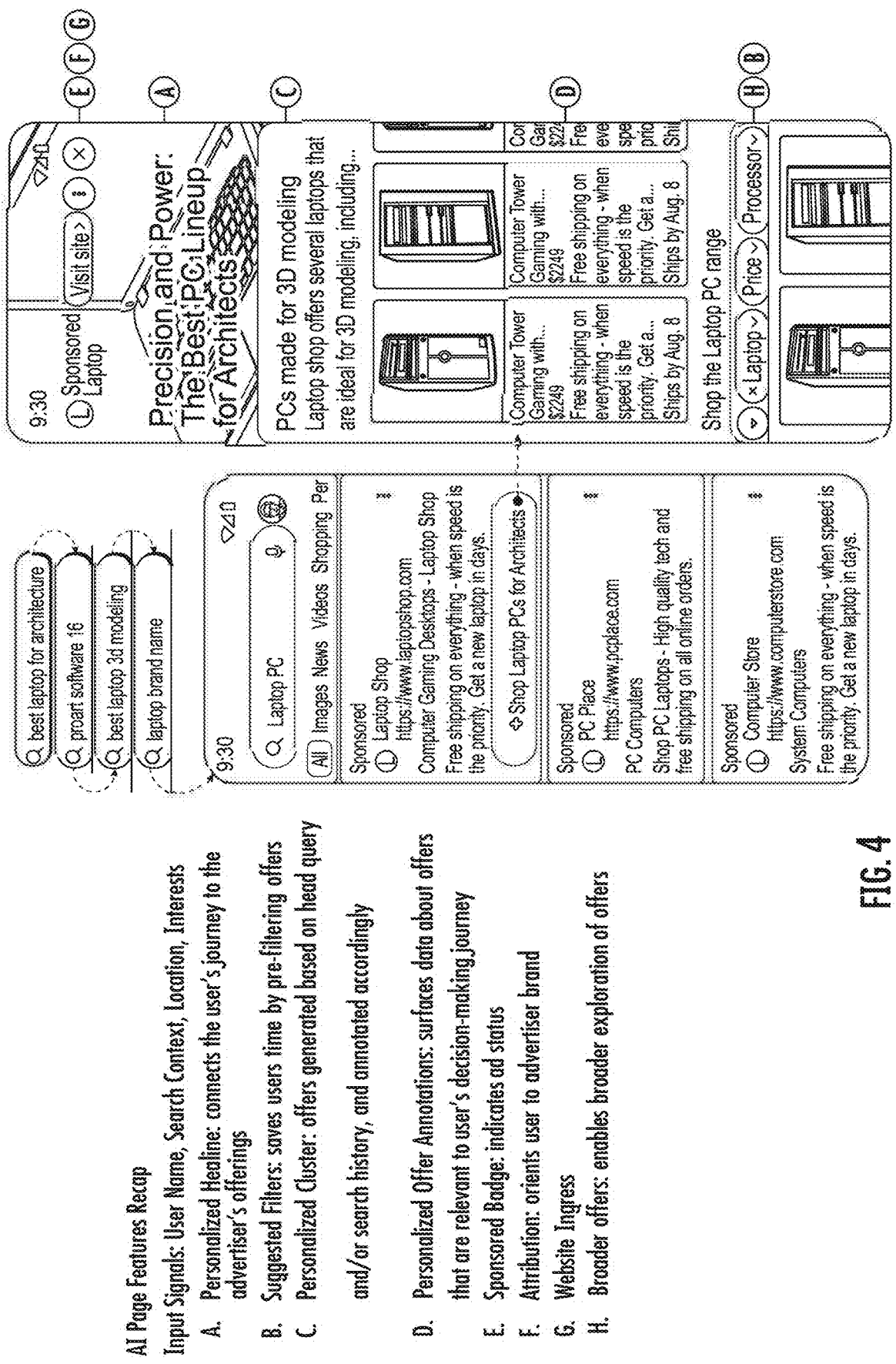

AI Page Features Recap

Input Signals: User Name, Search Context, Location, Interests

A. Personalized Headline: connects the user's journey to the advertiser's offerings
B. Suggested Filters: saves users time by pre-filtering offers
C. Personalized Cluster: offers generated based on head query and/or search history, and annotated accordingly
D. Personalized Offer Annotations: surfaces data about offers that are relevant to user's decision-making journey
E. Sponsored Badge: indicates ad status
F. Attribution: orients user to advertiser brand
G. Website Ingress
H. Broader offers: enables broader exploration of offers

FIG. 4

AI-GENERATED CONTENT PAGE TAILORED TO A SPECIFIC USER

PRIORITY CLAIM

The present application claims the benefit of priority of U.S. Provisional Patent Application No. 63/675,726 filed on Jul. 25, 2024, which is incorporated by reference herein.

FIELD

The present disclosure relates generally to automatically generating content pages based on a user query and contextual information (e.g., previous user queries).

BACKGROUND

In a conventional system, a search result page can include sitelinks to a plurality of landing pages of different organizations. In some instances, the landing pages may be difficult to navigate, which can reduce the user experience. For example, a user may struggle to navigate a landing page to purchase a product when the landing page has a user interface that is not efficiently designed for usability and engagement. To improve the user experience and engagement, the content presented to a user should be relevant to the user query, and the user interface should be easy to navigate with an intuitive design to improve usability and engagement.

SUMMARY

Aspects and advantages of embodiments of the present disclosure will be set forth in part in the following description, or can be learned from the description, or can be learned through practice of the embodiments.

One example aspect of the present disclosure is directed to a computing system for generating an artificial intelligence (AI)-generated page associated with a first organization. The system can include one or more processors. Additionally, the system can include one or more non-transitory computer-readable media that collectively store a machine-learned model and instructions. The machine-learned model can be configured to generate the AI-generated page. The instructions that, when executed by the one or more processors, cause the computing system to perform operations. The operations can include receiving from a user device associated with a user account, the user query. Additionally, the instructions can include generating a search result page for the user query, the search result page having a first result associated with a first landing page of the first organization. Moreover, the instructions can include calculating a landing page score for the first landing page. Furthermore, the instructions can include generating an updated search result page based on the landing page score exceeding a threshold value, the updated search result page having a navigation link to an AI-generated page for the first organization. Subsequently, the instructions can include causing a presentation, on a display of the user device, the updated search result page. In some instances, the AI-generated page can be presented to another organization that is different from the first organization. Additionally, the AI-generated page can be utilized for future search.

In some instances, the system can receive, from the user device, an indication to view the AI-generated page for the first organization. Additionally, the system can obtain contextual information associated with the user account, the contextual information including a previous query. Moreover, the system can process the user query and the contextual information, using the machine-learned model, to generate the AI-generated page. Furthermore, the system can cause a presentation, on the display of the user account, the AI-generated page.

In some instances, the AI-generated page can include a call-to-action button to a product page of a product associated with the first organization.

In some instances, the AI-generated page can include a product feed that provides an overview of a product associated with the first organization.

In some instances, the AI-generated page can include an AI chatbot.

In some instances, each component of the AI-generated page is annotated with dynamically generated content based on the user query.

In some instances, the landing page score can be determined based on a conversion rate associated with the first landing page.

In some instances, the landing page score can be determined based on a bounce rate of the first landing page.

In some instances, the landing page score can be determined based on a click-through rate.

In some instances, the landing page score can be determined based on a qualitative factor, the qualitative factor being page design quality or content quality.

In some instances, the updated search result page can include a personalized headline, suggested filters, and suggested clusters.

In some instances, the navigation link can be included in a sponsored content item.

In some instances, the landing page score can exceed a threshold value when the first landing page does not have a filter for products.

In some instances, the AI-generated page can include information about a previous query.

In some instances, the AI-generated page can include a sitelink to a product detail page.

In some instances, the landing page score can be calculated based on performance metrics of the landing page.

In some instances the landing page score can be calculated based on content quality and design of the first landing page.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4 depicts a graphical user interface of an example AI-generated content page according to example embodiments of the present disclosure.

Figure 1:
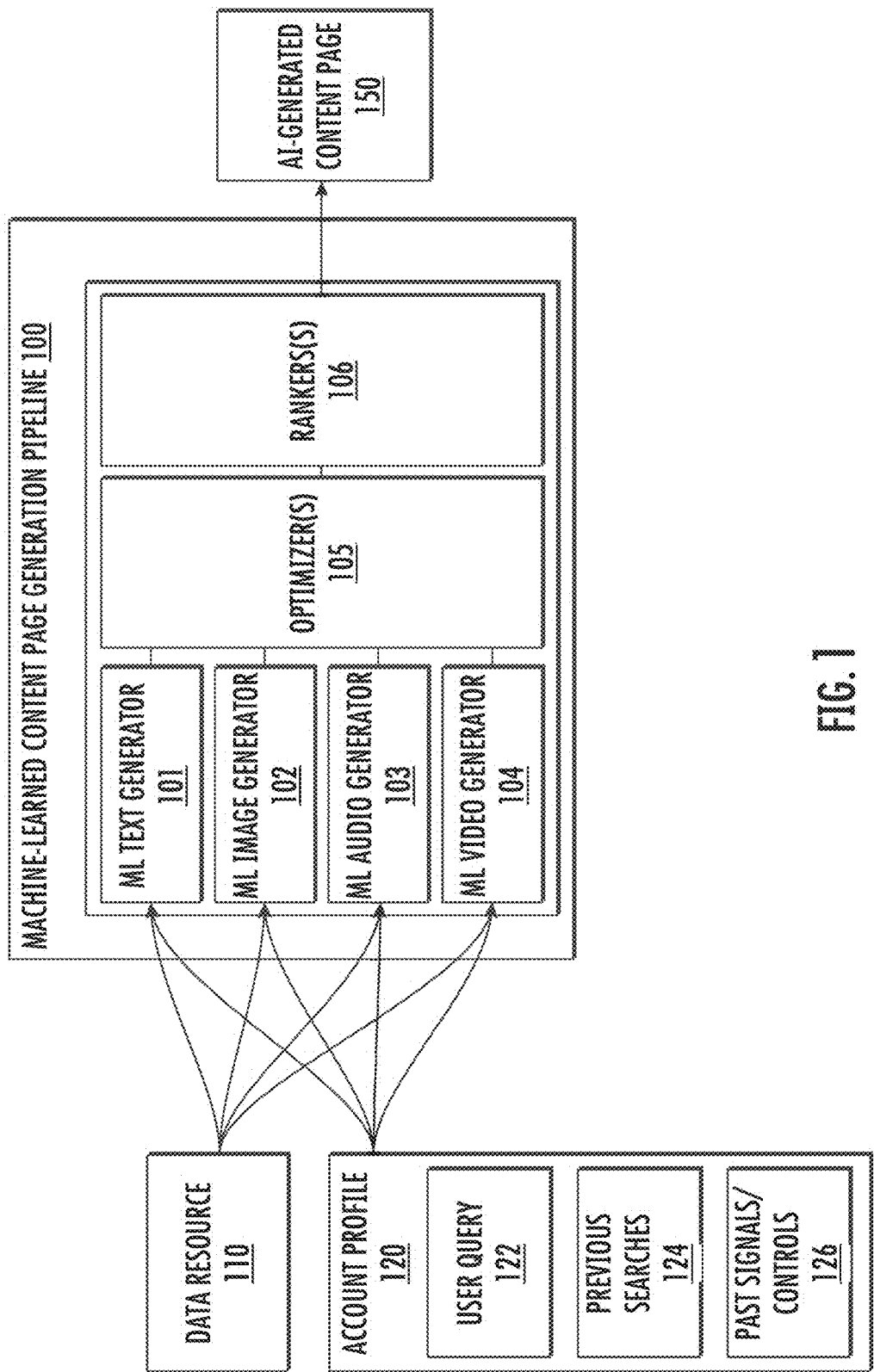
FIG. 1 depicts a block diagram of an example machine-learned content page generation system according to example embodiments of the present disclosure.

Reference numerals that are repeated across plural figures are intended to identify the same features in various implementations.

DETAILED DESCRIPTION

Generally, the present disclosure is directed to automatically generating content pages that are specifically tailored to a user based on their search history. The system enables users to make quicker, more confident decisions on a search engine by contextualizing landing pages to each individual. The system can utilize past queries, current queries, and other signals to better curate search results and/or webpage for a user. The system enables a personalized experience that leverages a range of signals (e.g., search context, location, preferences) with an improved user interface that includes predictable engagement patterns. Additionally, the system can improve performance of content providers by improving performance metrics (e.g., total conversions, conversion rates). Additionally, content providers can access generative artificial intelligence (AI) features (e.g., guides, multimodal understanding) without any additional efforts from their administrators. The system can generate landings pages for a plurality of content providers.

In some instances, the system can generate an immersive page for a query that may have poor targeting and/or a poor landing page.

Examples of the disclosure provide several technical effects, benefits, and/or improvements in computing technology and artificial intelligence techniques that involve the use of machine learning algorithms to improve user experience. The techniques described herein improve the use of generative models by improving the quality of the generated content. For example, by using the user query and previous search requests, the model can determine content specifically tailored to the user. The machine-learned models described herein perform a transfer of knowledge by using the search queries which can result in higher performance of the landing pages. Additionally, by using more content-relevant data, the system improves the performance of generative models. Moreover, the system utilizes better training techniques by developing more efficient and effective training techniques that are specific to the user account (e.g., based on user search) to reduce the time and resources required to train models. Furthermore, the system can incorporate user feedback and provide the feedback, via reinforcement learning or active learning, to generative models that can help the models learn from user preferences and improve over time. The present disclosure can reduce processing by reducing the number of manual inputs provided by a user and by reducing the number of interface screens which must be obtained, loaded, interacted with, and updated. For example, the system can automatically create a communication campaign with minimum user interaction by ranking and selecting media assets based on their determined performance value.

With reference now to the Figures, example embodiments of the present disclosure will be discussed in further detail.

FIG. 1 depicts an example system for implementing a machine-learned content page generation pipeline 100. Machine-learned content page generation pipeline 100 can include a machine-learned text generator 101. Machine-learned content page generation pipeline 100 can include a machine-learned image generator 102. Machine-learned content page generation pipeline 100 can include a machine-learned audio generator 103. Machine-learned content page generation pipeline 100 can include a machine-learned video generator 104. Machine-learned content page generation pipeline 100 can include one or more optimizer(s) 105 to apply one or more optimization algorithms to the outputs of any one or more of machine-learned generator models 101 to 104. Machine-learned content page generation pipeline 100 can include one or more rank(s) 106 to rank outputs of any one or more of machine-learned generator models 101 to 104.

Machine-learned content page generation pipeline 100 can ingest data from a data resource 110 and data from an account profile 120. Account profile 120 can include user preferences. Account profile 120 can include a user query 122. Account profile 120 can include previous searches for 124 of the users. Account profile 120 can include past signals/controls 126 input to the machine-learned media asset generation pipeline 100. Machine-learned content page generation pipeline 100 can process the data retrieved from data resource 110 and account profile 120 to generate the AI-generated content page 150.

Machine-learned content page generation pipeline 100 can include an asset feedback layer 140. Asset feedback layer 140 can facilitate input of user feedback on generated assets and initiate generation of updated or different assets. After selection, confirmation, or approval using asset feedback layer 140, Machine-learned content page generation pipeline 100 can output an AI-generated content page 150.

Figure 2:
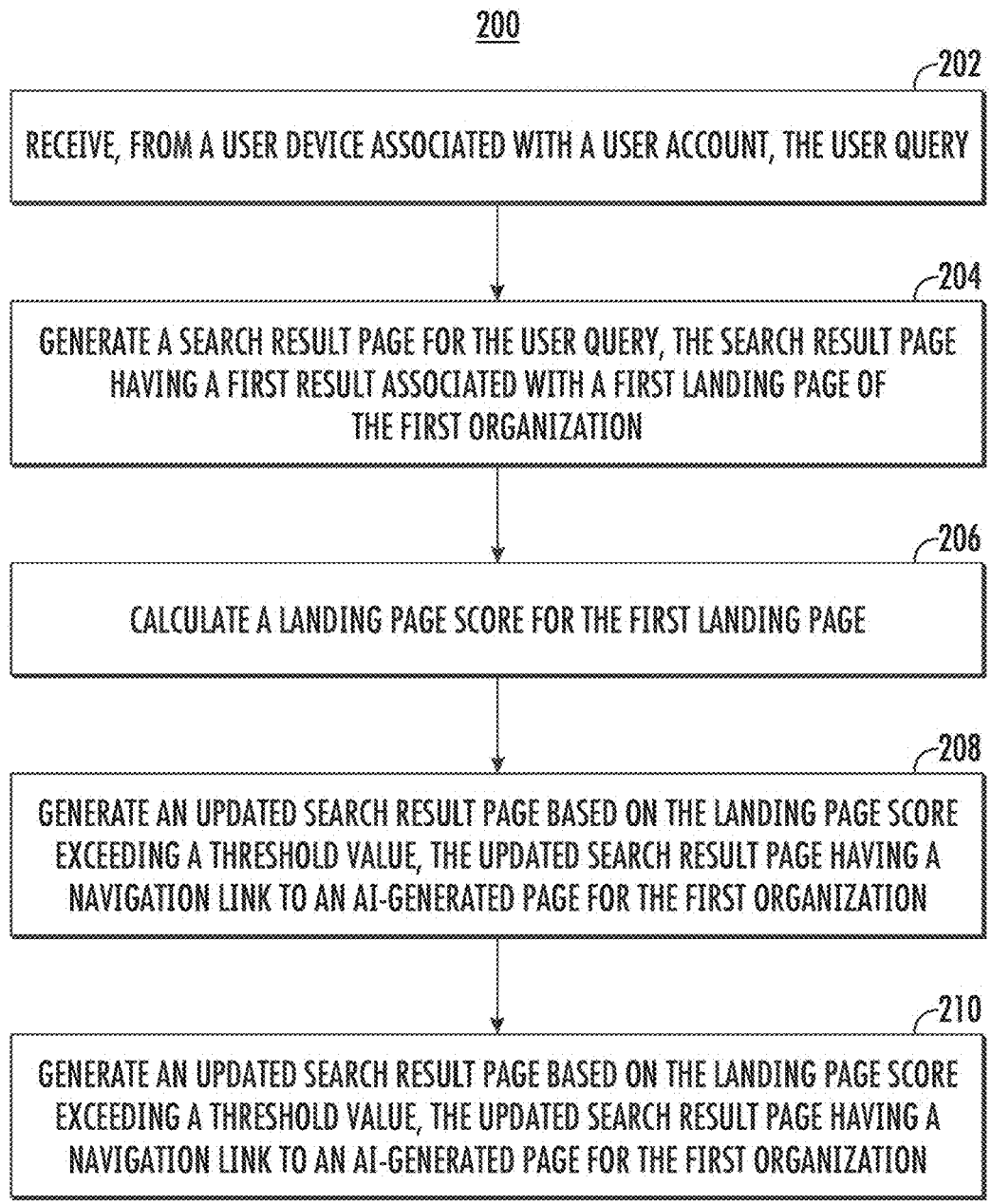
FIG. 2 depicts a flow diagram of an example process for generating an updated search result page having a navigation link to an AI-generated page according to example embodiments of the present disclosure.

FIG. 2 depicts a flow diagram of an example method 200 for generating an updated search result page with a navigation link to an AI-generated content page in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 200 is performed by a server computing system (e.g., server computing system 60) or client computing system (e.g., computing devices 50). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processors can be omitted in various embodiments. Thus, not all processes are required in every embodiment. Other process flows are possible.

At 202, the system can receive from a user device associated with a user account, the user query.

At 204, the system can generate a search result page for the user query. The search result page can include a first result associated with a first landing page of the first organization.

At 206, the system can calculate a landing page score for the first landing page.

At 208, the system can generate an updated search result page based on the landing page score exceeding a threshold value, the updated search result page having a navigation link to an AI-generated page for the first organization.

At 210, the system can cause a presentation, on a display of the user device, the updated search result page.

In some instances, method 200 can further the system receiving, from the user device, an indication to view the AI-generated page for the first organization. Additionally, the system can obtain contextual information associated with the user account, the contextual information including a previous query. Moreover, the system can process the user query and the contextual information, using the machine-learned model, to generate the AI-generated page. Furthermore, the system can cause a presentation, on the display of the user account, the AI-generated page.

In some instances, the AI-generated page includes a call-to-action button to a product page of a product associated with the first organization.

In some instances, the AI-generated page includes a product feed that provides an overview of a product associated with the first organization.

In some instances, the AI-generated page includes an AI chatbot.

In some instances, each component of the AI-generated page is annotated with dynamically generated content based on the user query.

In some instances, the landing page score is determined based on a conversion rate associated with the first landing page.

In some instances, the landing page score is determined based on a bounce rate of the first landing page.

In some instances, the landing page score is determined based on a click-through rate.

In some instances, the landing page score is determined based on a qualitative factor, the qualitative factor being page design quality or content quality.

Figure 3:
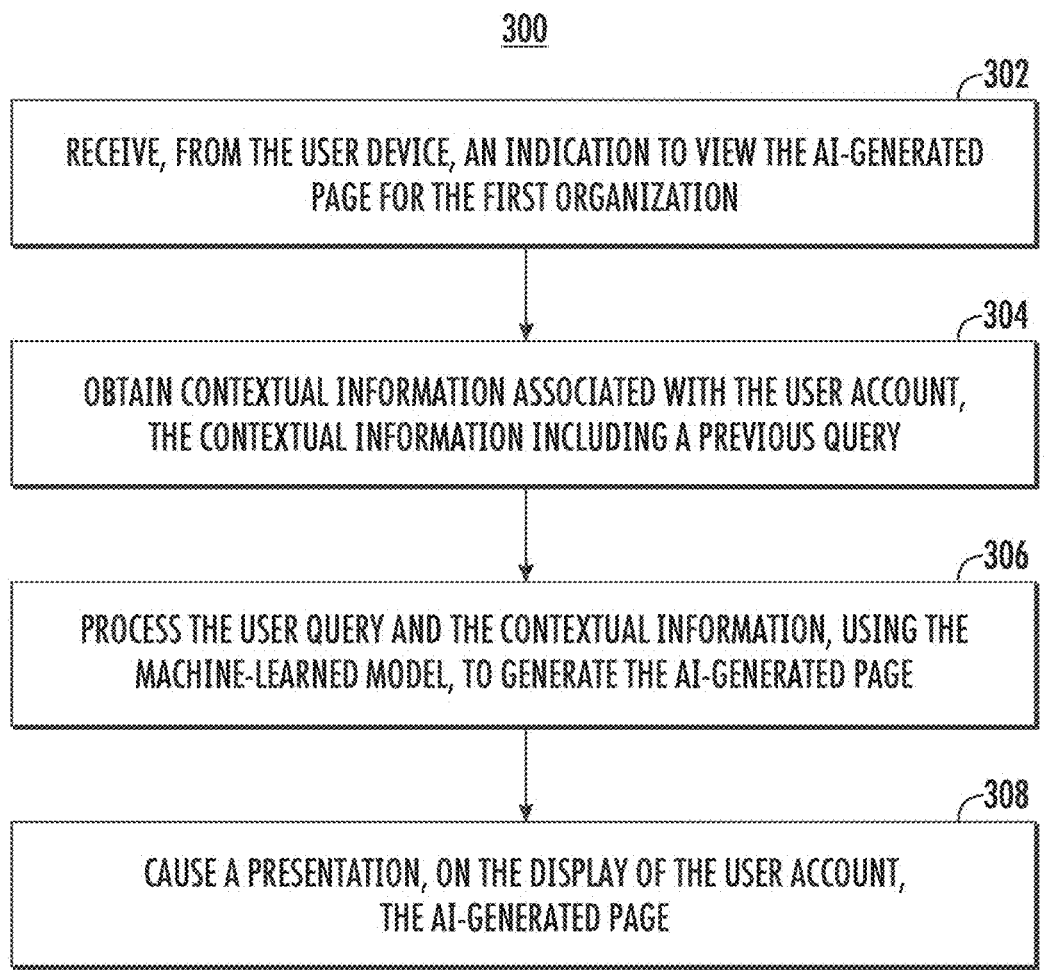
FIG. 3 depicts a flow diagram of an example process for generating an AI-generated content page according to example embodiments of the present disclosure.

FIG. 3 depicts a flow diagram of an example method 300 for generating an AI-generated content page in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 is performed by a server computing system (e.g., server computing system 60) or client computing system (e.g., computing devices 50). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processors can be omitted in various embodiments. Thus, not all processes are required in every embodiment. Other process flows are possible.

At operation 302, the system can receive, from the user device, an indication to view the AI-generated page for the first organization.

At operation 304, the system can obtain contextual information associated with the user account, the contextual information including a previous query.

At operation 306, the system can process the user query and the contextual information, using the machine-learned model, to generate the AI-generated page.

At operation 308, the system can cause a presentation, on the display of the user account, the AI-generated page.

FIG. 4 depicts a graphical user interface of an example AI-generated content page according to example embodiments of the present disclosure. In this example, a user's journey can include previous searches for "best laptop for architecture", "best laptop for 3D modeling", and "a specific laptop brand name." During the subsequent search, the system can generate a link to an AI-generated page that is customized to the user based on user information (e.g., previous search, user interactions).

Figure 5:
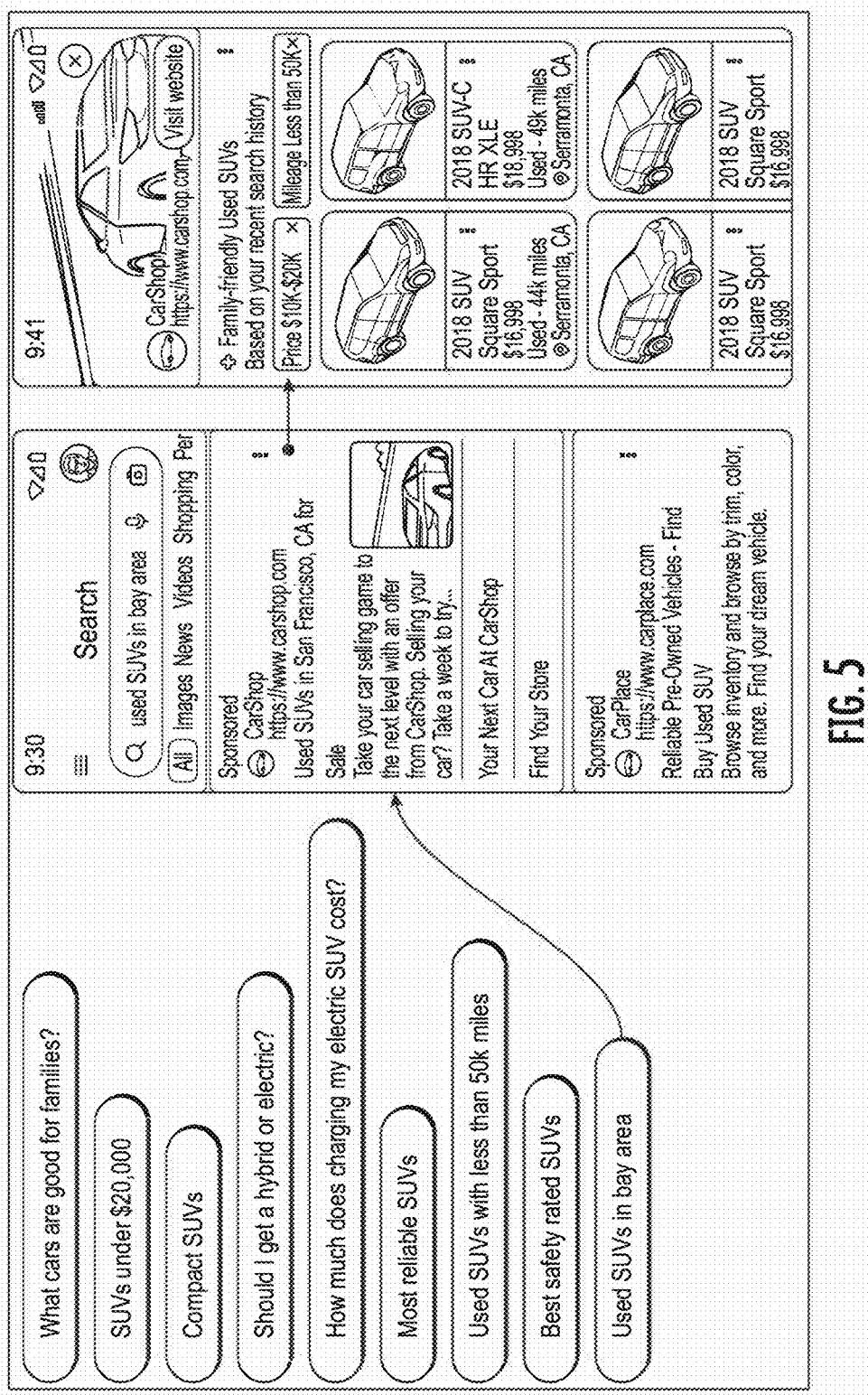
FIG. 5 depicts another graphical user interface of an example AI-generated content page according to example embodiments of the present disclosure.

FIG. 5 depicts another graphical user interface of an example AI-generated content page according to example embodiments of the present disclosure.

Figure 6:
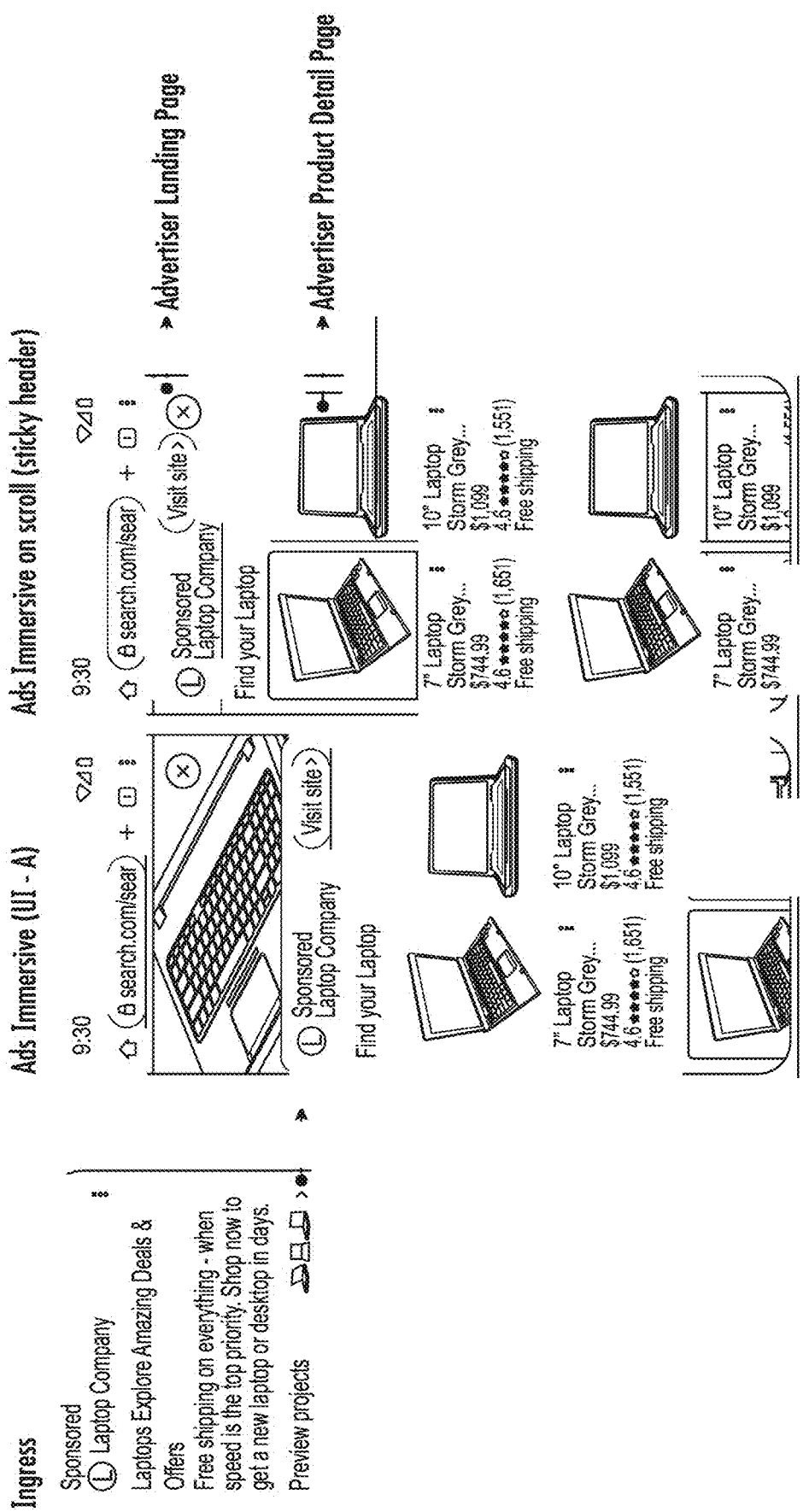
FIG. 6 depicts another graphical user interface of an example AI-generated content page according to example embodiments of the present disclosure.

FIG. 6 depicts another graphical user interface of an example AI-generated content page according to example embodiments of the present disclosure.

Figure 7:
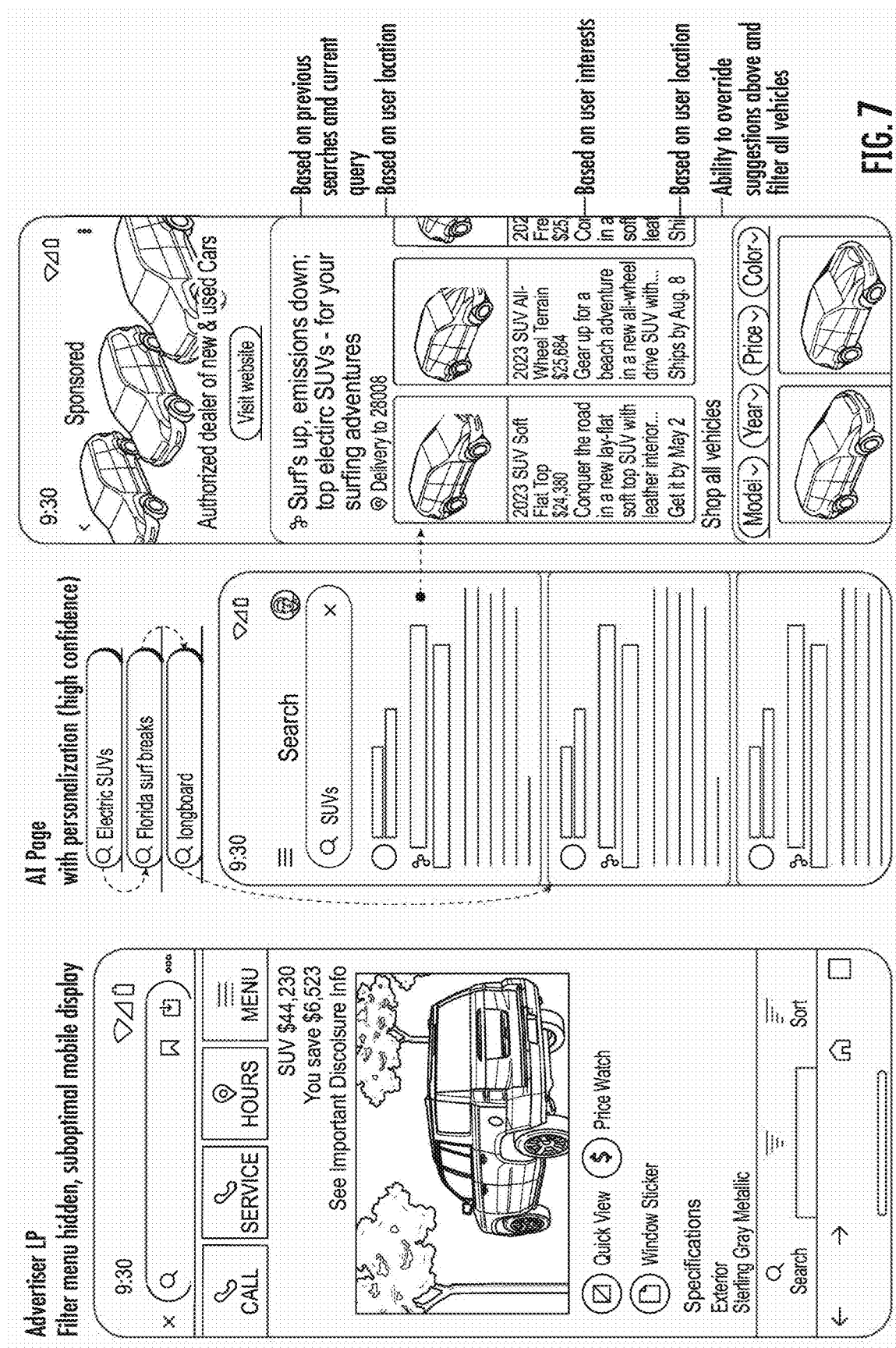
FIG. 7 depicts another graphical user interface of an example AI-generated content page according to example embodiments of the present disclosure.

FIG. 7 depicts another graphical user interface of an example AI-generated content page according to example embodiments of the present disclosure.

Figure 8:
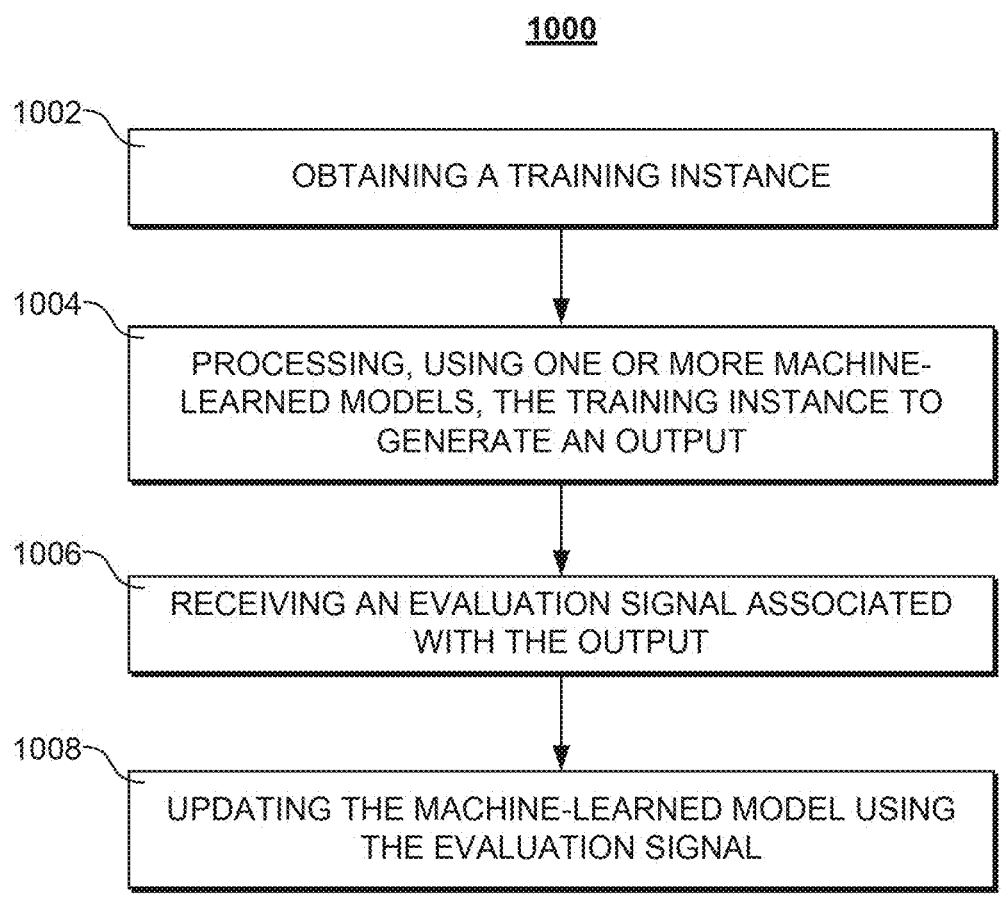
FIG. 8 is a flow chart diagram illustrating an example method for training a machine-learned model according to example implementations of aspects of the present disclosure.

FIG. 8 depicts a flowchart of a method 1000 for training one or more machine-learned models according to aspects of the present disclosure. For instance, an example machine-learned model can include machine-learned media asset generation pipeline, machine-learned content item generation pipeline, a machine-learned text generator, a machine-learned image generator, a machine-learned audio generator, and a machine-learned video generator.

One or more portion(s) of example method 1000 can be implemented by a computing system that includes one or more computing devices such as, for example, computing systems described with reference to the other figures. Each respective portion of example method 1000 can be performed by any (or any combination) of one or more computing devices. Moreover, one or more portion(s) of example method 1000 can be implemented on the hardware components of the device(s) described herein, for example, to train one or more systems or models. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of example method 1000 can be performed additionally, or alternatively, by other systems.

At 1002, example method 1000 can include obtaining a training instance. A set of training data can include a plurality of training instances divided between multiple datasets (e.g., a training dataset, a validation dataset, or testing dataset). A training instance can be labeled or unlabeled. Although referred to in example method 1000 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 1004, example method 1000 can include processing, using one or more machine-learned models, the training instance to generate an output. The output can be directly obtained from the one or more machine-learned models or can be a downstream result of a chain of processing operations that includes an output of the one or more machine-learned models.

At 1006, example method 1000 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 1008, example method 1000 can include updating the machine-learned model using the evaluation signal. For example, values for parameters of the machine-learned model(s) can be learned, in some embodiments, using various training or learning techniques, such as, for example, backwards propagation. For example, the evaluation signal can be back propagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 1000 can include implementing a number of generalization techniques (e.g., weight decays, dropouts, etc.) to improve the generalization capability of the models being trained.

In some implementations, example method 1000 can be implemented for training a machine-learned model from an initialized state to a fully trained state (e.g., when the model exhibits a desired performance profile, such as based on accuracy, precision, recall, etc.).

In some implementations, example method 1000 can be implemented for particular stages of a training procedure. For instance, in some implementations, example method 1000 can be implemented for pre-training a machine-learned model. Pre-training can include, for instance, large-scale training over potentially noisy data to achieve a broad base of performance levels across a variety of tasks/data types. In some implementations, example method 1000 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

Figure 9:
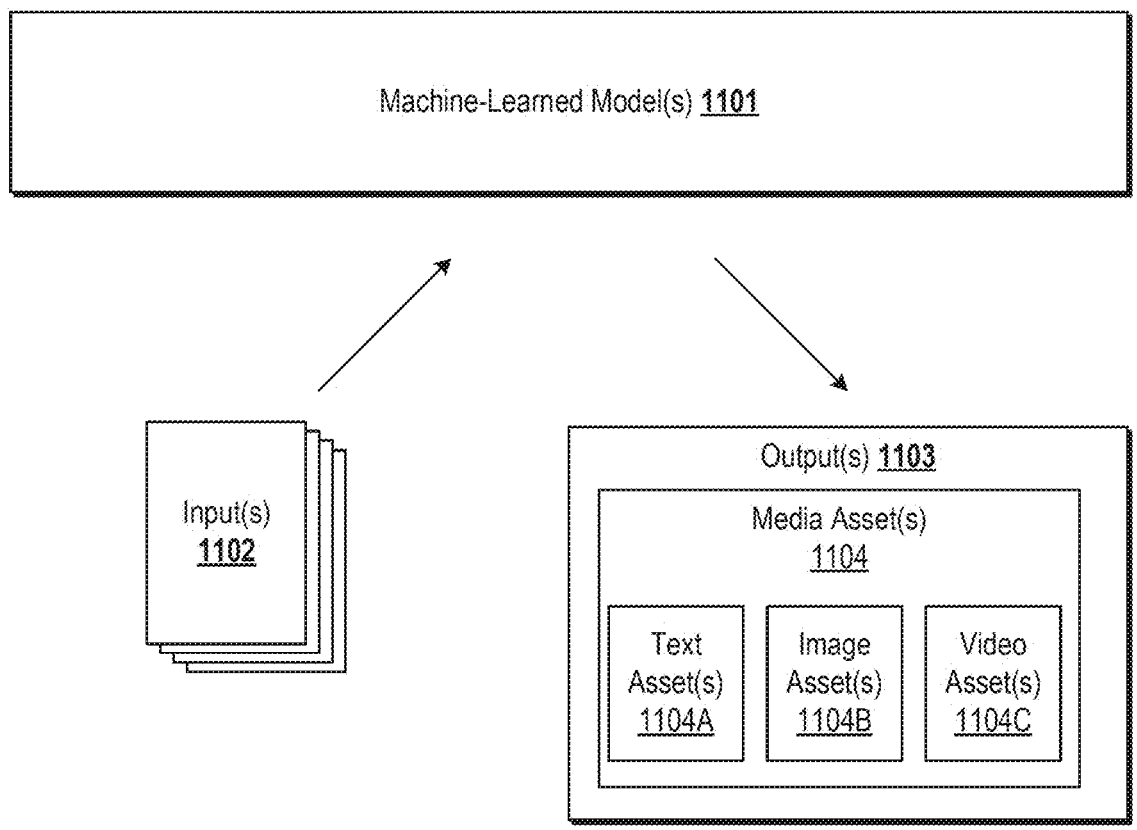
FIG. 9 is a block diagram of an example processing flow for using machine-learned model(s) to process input(s) to generate output(s) according to example implementations of aspects of the present disclosure.

FIG. 9 is a block diagram of an example processing flow for using machine-learned model(s) 1101 to process input(s) 1102 to generate output(s) 1103.

Machine-learned model(s) 1101 can be or include one or multiple machine-learned models or model components. For instance, machine-learned model(s) 1101 can include machine-learned media asset generation model 1101A and/or machine-learned content item generation model 1101B. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1101 can include a single or multiple instances of the same model configured to operate on data from input(s) 1102. Machine-learned model(s) 1101 can include an ensemble of different models that can cooperatively interact to process data from input(s) 1102. For example, machine-learned model(s) 1101 701 can employ a mixture-of-experts structure.

Input(s) 1102 can generally include or otherwise represent various types of data. Input(s) 1102 can include one type or many different types of data. For instance, inputs can include existing media asset(s) 1102A (e.g., existing content items) and/or data resources 1102B. Output(s) 1103 can be data of the same type(s) or of different types of data as compared to input(s) 1102. Output(s) 1103 can include one type or many different types of data. For instance, output(s) 1103 can include media asset(s) 1104 and/or content item(s) 1105. Media asset(s) 1104 can include, for example, text asset(s) 1104A, image asset(s) 1104B, and/or unique profile data 1104C.

Example data types for input(s) 1102 or output(s) 1103 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 1102 or outputs 1103, example combinations of data types include image data and audio data, image data and natural language data, natural language data and software code data, image data and biometric data, sensor data and medical data, etc. It is to be understood that any combination of data types in an input 1102 or an output 1103 can be present.

An example input 1102 can include one or multiple data types, such as the example data types noted above. An example output 1103 can include one or multiple data types, such as the example data types noted above. The data type(s) of input 1102 can be the same as or different from the data type(s) of output 1103. It is to be understood that the example data types noted above are provided for illustrative purposes only. Data types contemplated within the scope of the present disclosure are not limited to those examples noted above.

Figure 10:
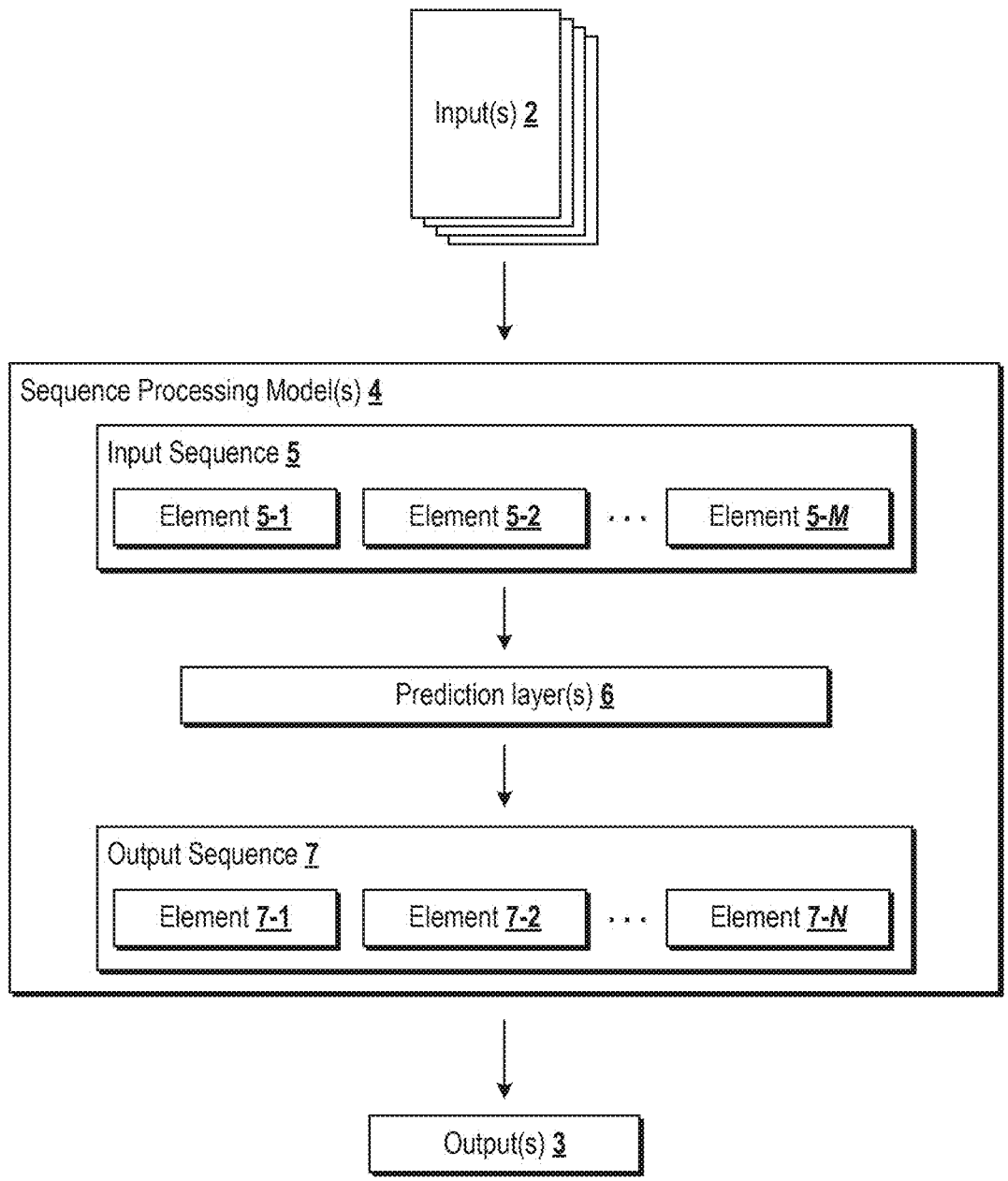
FIG. 10 is a block diagram of an example sequence processing model according to example implementations of aspects of the present disclosure.

FIG. 10 is a block diagram of an example implementation of an example machine-learned model configured to process sequences of information. For instance, an example implementation of machine-learned model(s) 1101 can include machine-learned sequence processing model(s) 4. An example system can pass input(s) 1102 to sequence processing model(s) 4. Sequence processing model(s) 4 can include one or more machine-learned components. Sequence processing model(s) 4 can process the data from input(s) 1102 to obtain an input sequence 5. Input sequence 5 can include one or more input elements 5-1, 5-2, . . . , 5-M, etc. obtained from input(s) 1102. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 1103 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, GOOGLE, https://ai.google/static/documents/palm2techreport.pdf (n.d.). Other example sequence processing models can operate in other domains, such as image domains, see, e.g., Dosovitskiy et al., *An Image is Worth 16×16 Words: Transformers for Image Recognition at Scale*, ARXIV: 2010.11929v2 (Jun. 3, 2021), audio domains, see, e.g., Agostinelli et al., *MusicLM: Generating Music From Text*, ARXIV: 2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 1102. For instance, input sequence 5 can include a representation of data from input(s) 1102 in a format understood by sequence processing model(s) 4. One or more machine-learned components of sequence processing model(s) 4 can ingest the data from input(s) 1102, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 1102 and parse the data into a sequence of elements to obtain input sequence 5. For example, a portion of input data from input(s) 1102 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 10 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of _____." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other.

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 11:
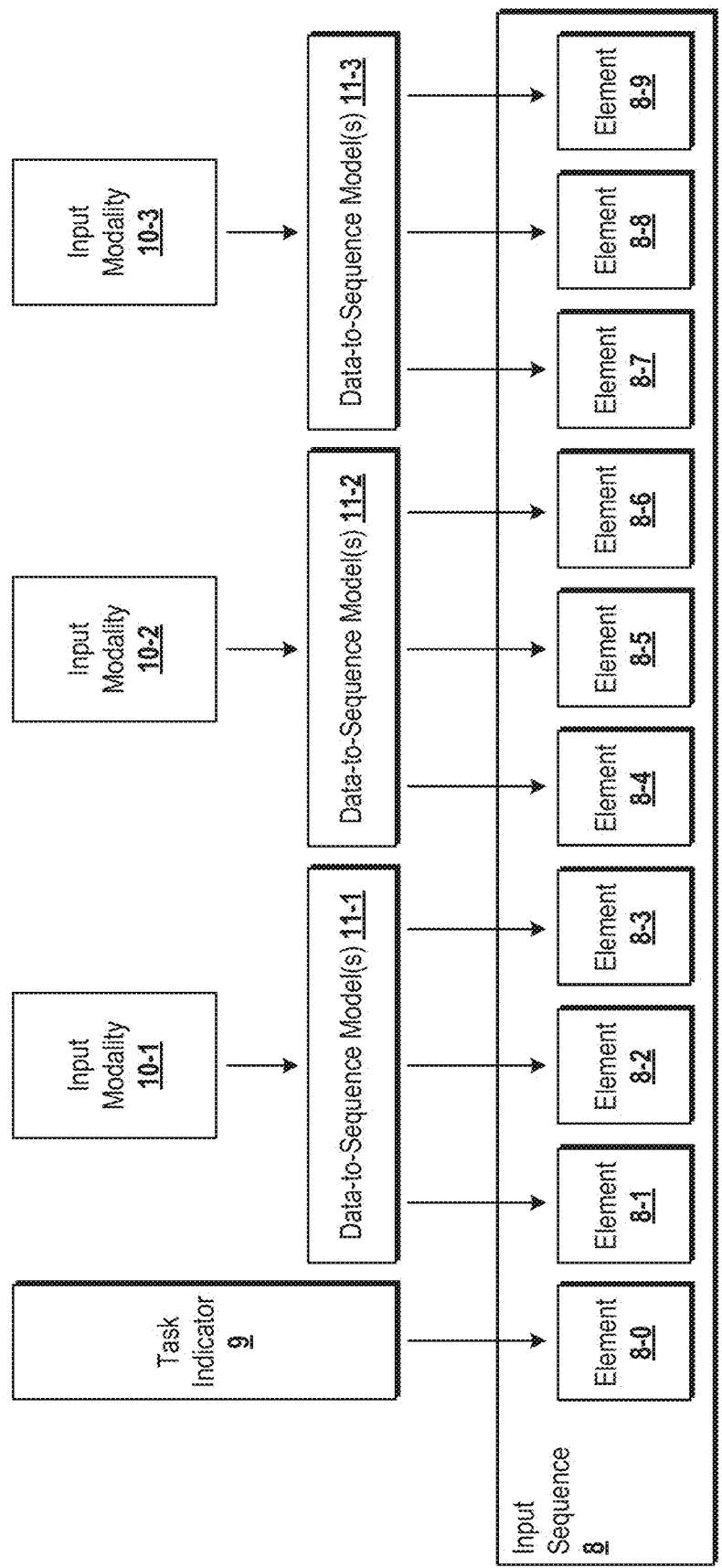
FIG. 11 is a block diagram of an example technique for populating an example input sequence for processing by a sequence processing model according to example implementations of aspects of the present disclosure.

FIG. 11 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be learned within a continuous embedding space.

Input modalities 10-1, 10-2, and 10-3 can be associated with various different data types (e.g., as described above with respect to input(s) 1102 and output(s) 1103).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Figure 12:
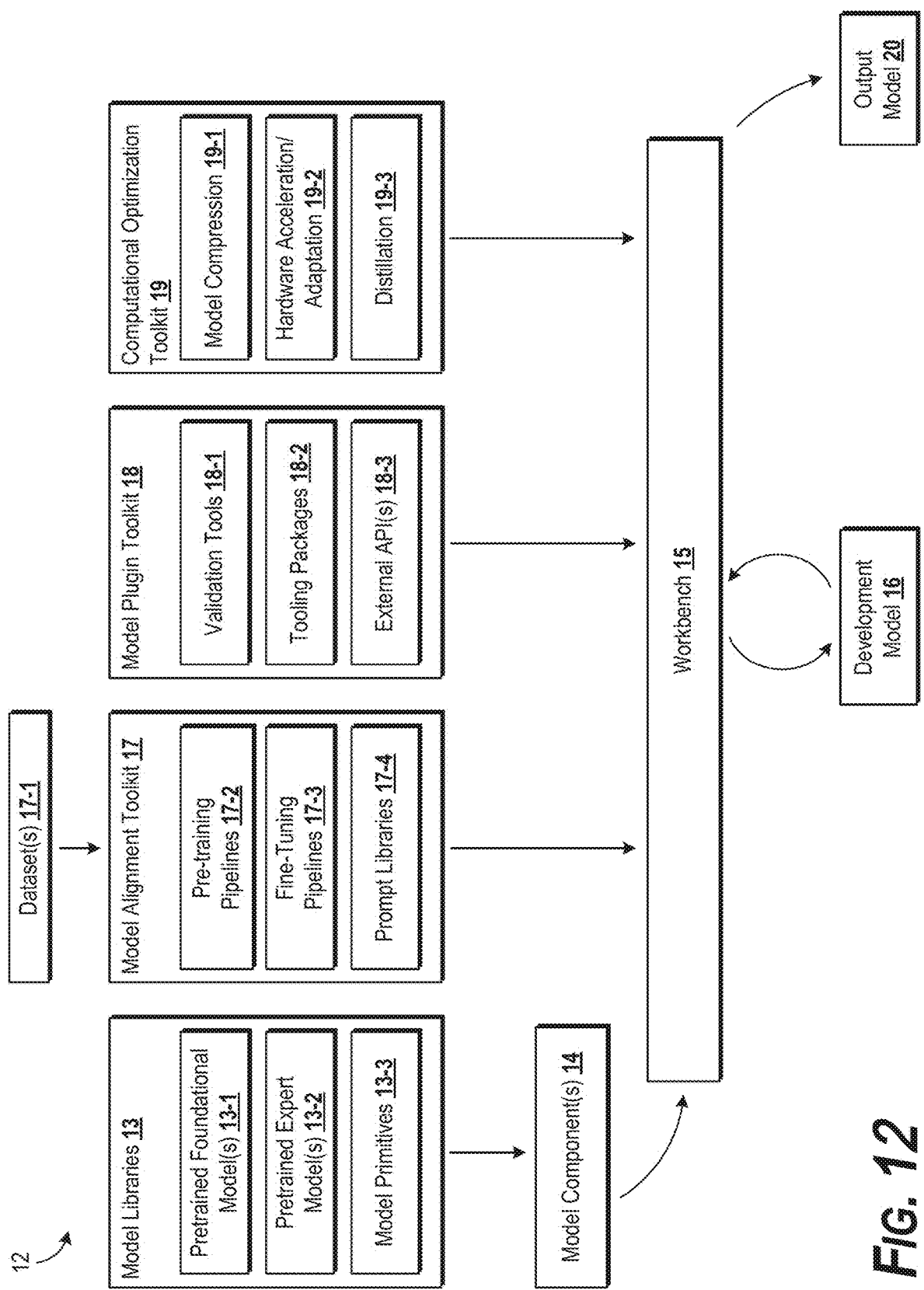
FIG. 12 is a block diagram of an example model development platform according to example implementations of aspects of the present disclosure.

FIG. 12 is a block diagram of an example model development platform 12 that can facilitate creation, adaptation, and refinement of example machine-learned models (e.g., machine-learned model(s) 1101, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing the accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals.

Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without examples in the inputs. For instance, zero-shot prompts can include inputs that lack examples. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based on one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output an input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 1600 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instructions that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 13:
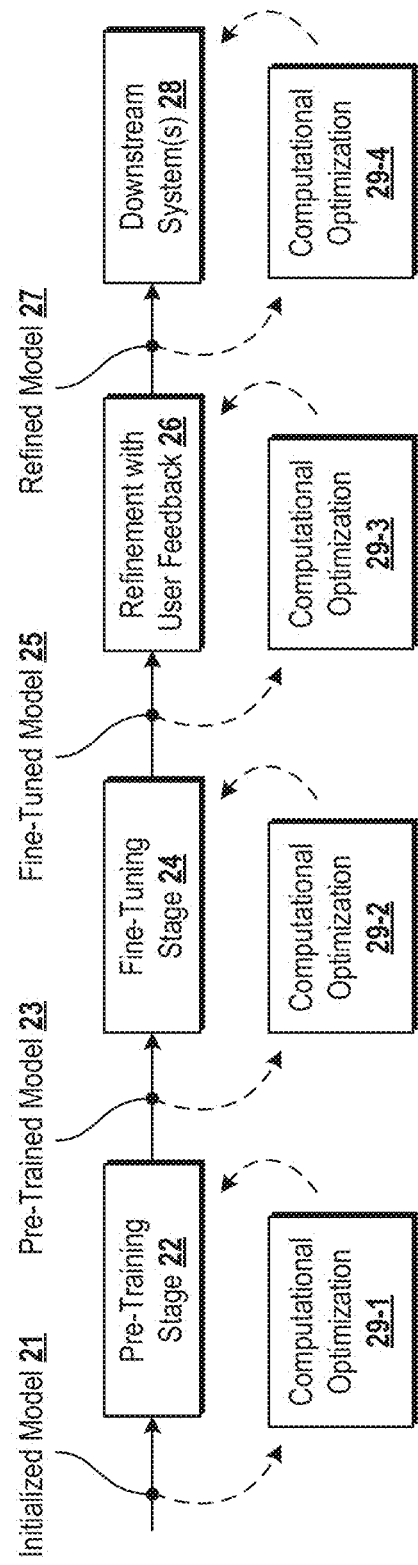
FIG. 13 is a block diagram of an example training workflow for training a machine-learned model according to example implementations of aspects of the present disclosure.

FIG. 13 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 21 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 21 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model has satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Figure 14:
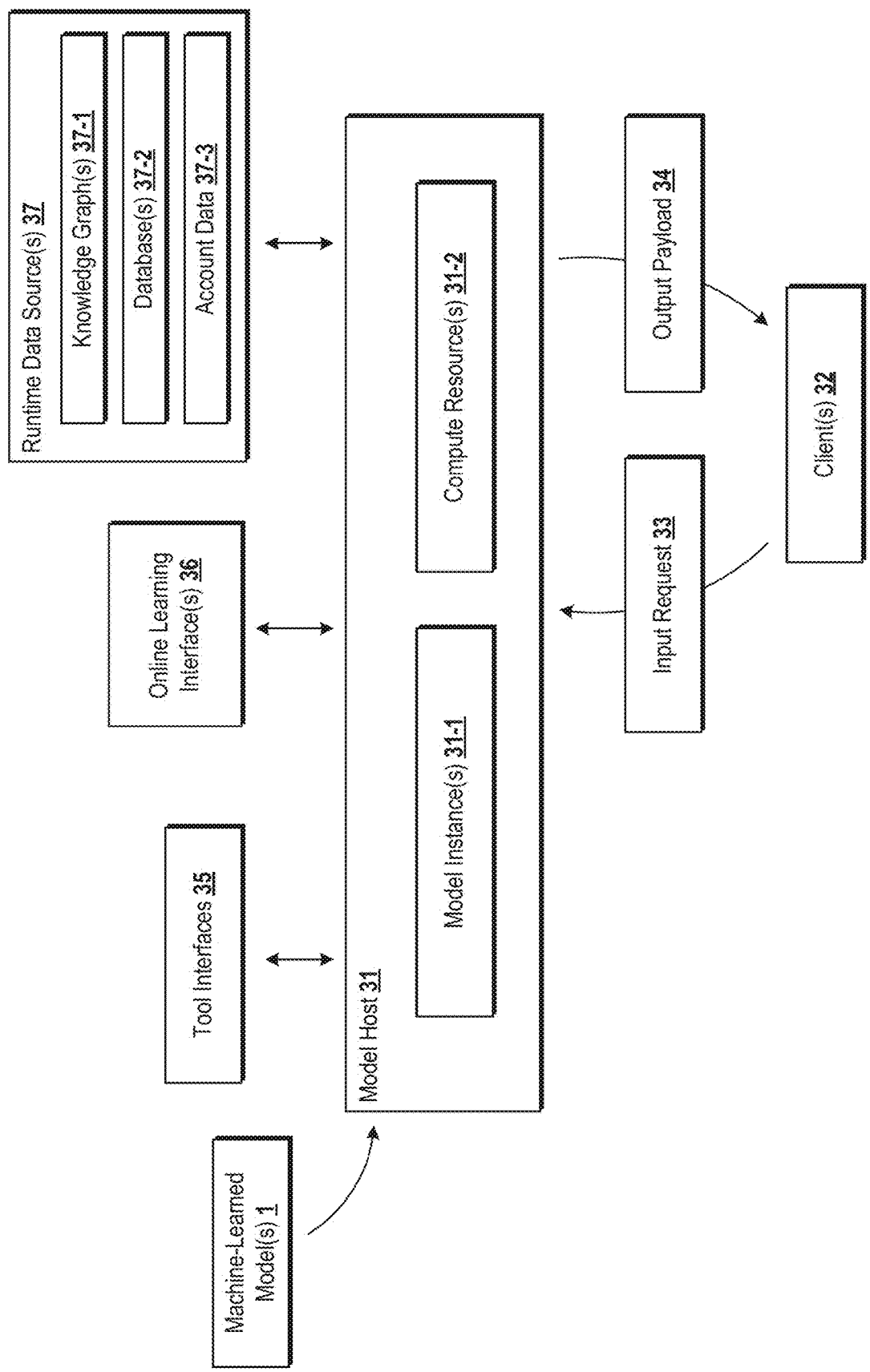
FIG. 14 is a block diagram of an inference system for operating one or more machine-learned model(s) to perform inference according to example implementations of aspects of the present disclosure.

FIG. 14 is a block diagram of an inference system for operating one or more machine-learned model(s) 1101 to perform inference (e.g., for training, for deployment, etc.). A model host 31 can receive machine-learned model(s) 1101. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 1102 for input to machine-learned model(s) 1101. Machine-learned model(s) 1 can process input(s) 1102 to generate output(s) 1103. Using output(s) 1103, model host 31 can return an output payload 34 for responding to input request 33 from client(s) 32. Output payload 34 can include or be based on output(s) 1103.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1101. For instance, online learning interface(s) 36 can be used within reinforcement learning loops to retrieve user feedback on inferences served by model host 31. Model host 31 can access runtime data source(s) 37 for augmenting input(s) 1102 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 1102. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) 2 can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on the same device or system as client(s) 32. Model host 31 can be a machine-learning service that runs on-device to provide machine-learning functionality to one or multiple applications operating on a client device, which can include an application implementing client(s) 32. Model host 31 can be a part of the same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also shard model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 1102. Model host 31 can process input request 33 to obtain input(s) 1102. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 1102 can be distributed across the batch dimension (e.g., rows of an array). The separate input(s) 1102 can include completely different contexts. The separate input(s) 1102 can be multiple inference steps of the same task. The separate input(s) 1102 can be staggered in an input structure, such that any given inference cycle can be operating on different portions of the respective input(s) 1102. In this manner, for instance, model host 31 can perform inference on the batch in parallel, such that output(s) 1103 can also contain the batch dimension and return the inference results for the batched input(s) 1102 in parallel. In this manner, for instance, batches of input request(s) 33 can be processed in parallel for higher throughput of output payload(s) 34.

Output payload 34 can include or be based on output(s) 1103 from machine-learned model(s) 1101. Model host 31 can process output(s) 1103 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1101. Online learning interface(s) 36 can facilitate reinforcement learning with human feedback (RLHF). Online learning interface(s) 36 can facilitate federated learning of machine-learned model(s) 1101.

Model host 31 can execute machine-learned model(s) 1101 to perform inference for various tasks using various types of data. For example, various different input(s) 1102 and output(s) 1103 can be used for various different tasks. In some implementations, input(s) 1102 can be or otherwise represent image data. Machine-learned model(s) 1 can process the image data to generate an output. As an example, machine-learned model(s) 1101 can process the image data to generate an image recognition output (e.g., a recognition of the image data, a latent embedding of the image data, an encoded representation of the image data, a hash of the image data, etc.). As another example, machine-learned model(s) 1101 can process the image data to generate an image segmentation output. As another example, machine-learned model(s) 1101 can process the image data to generate an image classification output. As another example, machine-learned model(s) 1101 can process the image data to generate an image data modification output (e.g., an alteration of the image data, etc.). As another example, machine-learned model(s) 1101 can process the image data to generate an encoded image data output (e.g., an encoded and/or compressed representation of the image data, etc.). As another example, machine-learned model(s) 1101 can process the image data to generate an upscaled image data output. As another example, machine-learned model(s) 1101 can process the image data to generate a prediction output.

In some implementations, the task is a computer vision task. In some cases, input(s) 1102 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 1102 can be or otherwise represent natural language data. Machine-learned model(s) 1 can process the natural language data to generate an output. As an example, machine-learned model(s) 1101 can process the natural language data to generate a language encoding output. As another example, machine-learned model(s) 1101 can process the natural language data to generate a latent text embedding output. As another example, machine-learned model(s) 1101 can process the natural language data to generate a translation output. As another example, machine-learned model(s) 1101 can process the natural language data to generate a classification output. As another example, machine-learned model(s) 1101 can process the natural language data to generate a textual segmentation output. As another example, machine-learned model(s) 1101 can process the natural language data to generate a semantic intent output. As another example, machine-learned model(s) 1101 can process the natural language data to generate an upscaled text or natural language output (e.g., text or natural language data that is higher quality than the input text or natural language, etc.). As another example, machine-learned model(s) 1101 can process the natural language data to generate a prediction output (e.g., one or more predicted next portions of natural language content).

In some implementations, input(s) 1102 can be or otherwise represent speech data (e.g., data describing spoken natural language, such as audio data, textual data, etc.). Machine-learned model(s) 1 can process the speech data to generate an output. As an example, machine-learned model(s) 1101 can process the speech data to generate a speech recognition output. As another example, machine-learned model(s) 1101 can process the speech data to generate a speech translation output. As another example, machine-learned model(s) 1101 can process the speech data to generate a latent embedding output. As another example, machine-learned model(s) 1101 can process the speech data to generate an encoded speech output (e.g., an encoded and/or compressed representation of the speech data, etc.). As another example, machine-learned model(s) 1101 can process the speech data to generate an upscaled speech output (e.g., speech data that is higher quality than the input speech data, etc.). As another example, machine-learned model(s) 1101 can process the speech data to generate a textual representation output (e.g., a textual representation of the input speech data, etc.). As another example, machine-learned model(s) 1101 can process the speech data to generate a prediction output.

In some implementations, input(s) 1102 can be or otherwise represent latent encoding data (e.g., a latent space representation of an input, etc.). Machine-learned model(s) 1 can process the latent encoding data to generate an output. As an example, machine-learned model(s) 1101 can process the latent encoding data to generate a recognition output. As another example, machine-learned model(s) 1101 can process the latent encoding data to generate a reconstruction output. As another example, machine-learned model(s) 1101 can process the latent encoding data to generate a search output. As another example, machine-learned model(s) 1101 can process the latent encoding data to generate a reclus-tering output. As another example, machine-learned model(s) 1101 can process the latent encoding data to generate a prediction output.

In some implementations, input(s) 1102 can be or otherwise represent statistical data. Statistical data can be, represent, or otherwise include data computed and/or calculated from some other data source. Machine-learned model(s) 1 can process the statistical data to generate an output. As an example, machine-learned model(s) 1101 can process the statistical data to generate a recognition output. As another example, machine-learned model(s) 1101 can process the statistical data to generate a prediction output. As another example, machine-learned model(s) 1101 can process the statistical data to generate a classification output. As another example, machine-learned model(s) 1101 can process the statistical data to generate a segmentation output. As another example, machine-learned model(s) 1101 can process the statistical data to generate a visualization output. As another example, machine-learned model(s) 1101 can process the statistical data to generate a diagnostic output.

In some implementations, input(s) 1102 can be or otherwise represent sensor data. Machine-learned model(s) 1 can process the sensor data to generate an output. As an example, machine-learned model(s) 1101 can process the sensor data to generate a recognition output. As another example, machine-learned model(s) 1101 can process the sensor data to generate a prediction output. As another example, machine-learned model(s) 1101 can process the sensor data to generate a classification output. As another example, machine-learned model(s) 1101 can process the sensor data to generate a segmentation output. As another example, machine-learned model(s) 1101 can process the sensor data to generate a visualization output. As another example, machine-learned model(s) 1101 can process the sensor data to generate a diagnostic output. As another example, machine-learned model(s) 1101 can process the sensor data to generate a detection output.

In some implementations, machine-learned model(s) 1101 can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1101 can be configured to output content generated in view of input(s) 1102. For instance, input(s) 1102 can be or otherwise represent data of one or more modalities that encodes context for generating additional content.

In some implementations, the task can be a text completion task. Machine-learned model(s) 1 can be configured to process input(s) 1102 that represent textual data and to generate output(s) 1103 that represent additional textual data that completes a textual sequence that includes input(s)

1102. For instance, machine-learned model(s) 1101 can be configured to generate output(s) 1103 to complete a sentence, paragraph, or portion of text that follows from a portion of text represented by input(s) 1102.

In some implementations, the task can be an instruction following the task. Machine-learned model(s) 1 can be configured to process input(s) 1102 that represent instructions to perform a function and to generate output(s) 1103 that advance a goal of satisfying the instruction function (e.g., at least a step of a multi-step procedure to perform the function). Output(s) 3 can represent data of the same or of a different modality as input(s) 1102. For instance, input(s) 1102 can represent textual data (e.g., natural language instructions for a task to be performed) and machine-learned model(s) 1101 can process input(s) 1102 to generate output(s) 1103 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1101 can process input(s) 1102 to generate output(s) 1103 that represent textual data responsive to the instructions (e.g., natural language responses, programming language responses, machine language responses, etc.). One or more output(s) 1103 can be iteratively or recursively generated to sequentially process and accomplish steps toward accomplishing the requested functionality. For instance, an initial output can be executed by an external system or be processed by machine-learned model(s) 1101 to complete an initial step of performing a function. Multiple steps can be performed, with a final output being obtained that is responsive to the initial instructions.

In some implementations, the task can be a question answering task. Machine-learned model(s) 1 can be configured to process input(s) 1102 that represent a question to answer and to generate output(s) 1103 that advance a goal of returning an answer to the question (e.g., at least a step of a multi-step procedure to perform the function). Output(s) 3 can represent data of the same or of a different modality as input(s) 1102. For instance, input(s) 1102 can represent textual data (e.g., natural language instructions for a task to be performed) and machine-learned model(s) 1101 can process input(s) 1102 to generate output(s) 1103 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1101 can process input(s) 1102 to generate output(s) 1103 that represent textual data responsive to the question (e.g., natural language responses, programming language responses, machine language responses, etc.). One or more output(s) 1103 can be iteratively or recursively generated to sequentially process and accomplish steps toward answering the question. For instance, an initial output can be executed by an external system or be processed by machine-learned model(s) 1101 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 1102 that represent context regarding a desired portion of image content. The context can include text data, image data, audio data, etc. Machine-learned model(s) 1 can be configured to generate output(s) 1103 that represent image data that depicts imagery related to the context. For instance, machine-learned model(s) 1101 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 1102 that represent context regarding a desired portion of audio content. The context can include text data, image data, audio data, etc. Machine-learned model(s) 1 can be configured to generate output(s) 1103 that represent audio data related to the context. For instance, machine-learned model(s) 1101 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 1102 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 1103 that represent data that aligns with the desired data. For instance, machine-learned model(s) 1101 can be configured to generate data values for populating a dataset. Values for the data object(s) can be selected based on the context (e.g., based on a probability determined based on the context).

FIG. 14 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 23 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1101, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1101, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or intraoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1101, 4, 16, 20, 55, 65, etc. (e.g., third-party resource(s) 85).

Figure 15:
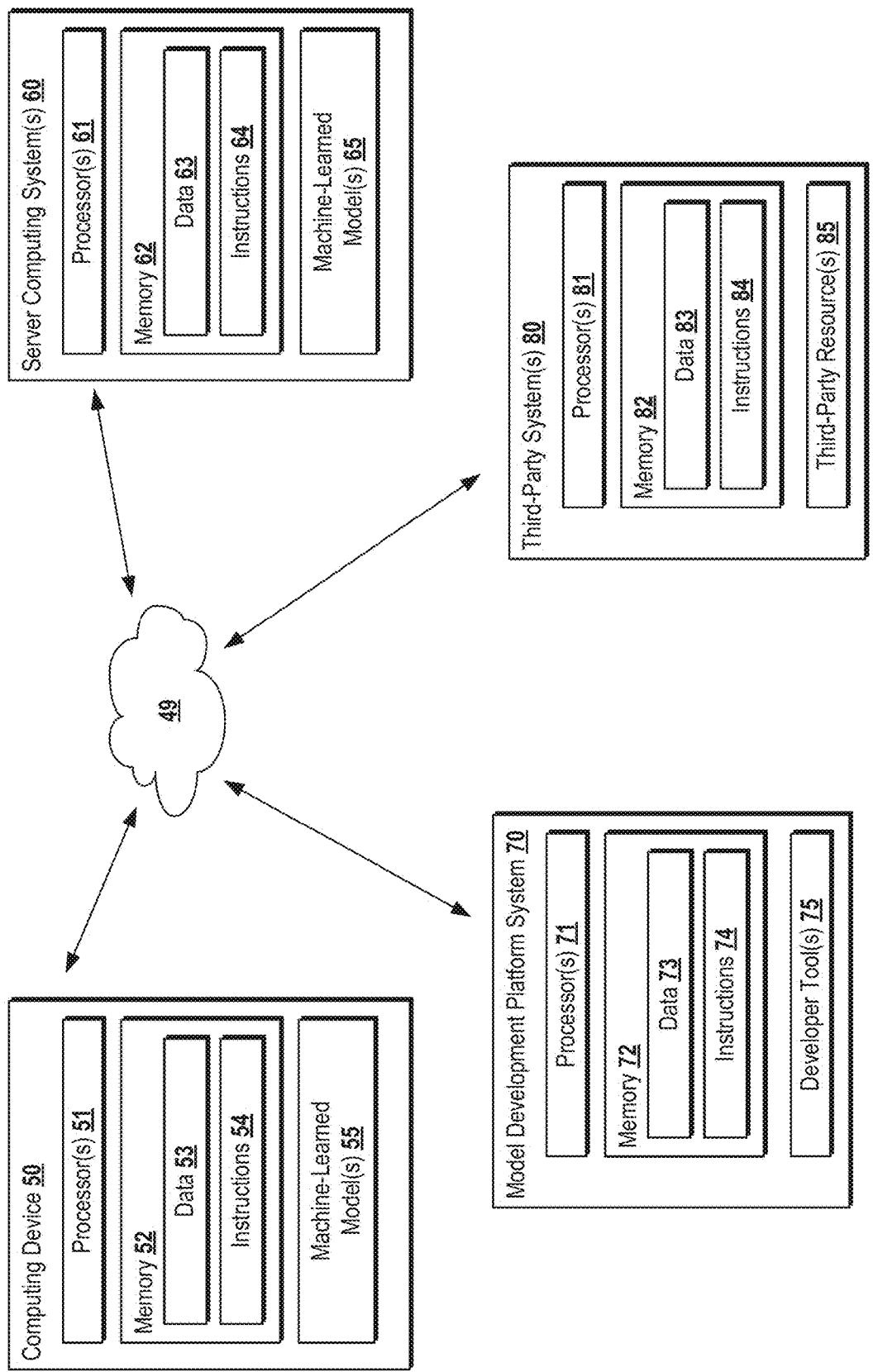
FIG. 15 is a block diagram of an example networked computing system according to example implementations of aspects of the present disclosure.
Figure 16:
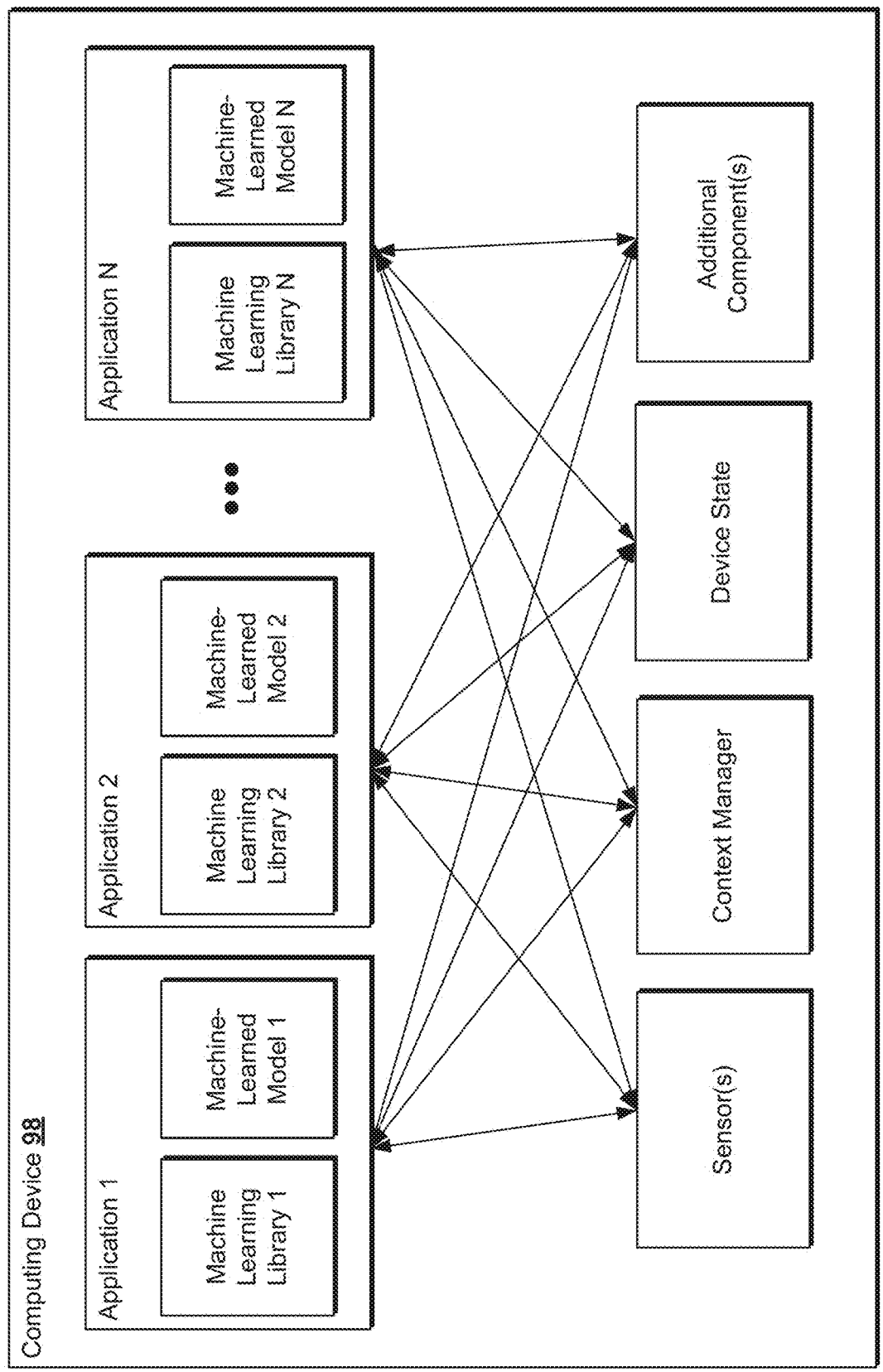
FIG. 16 is a block diagram of an example computing device according to example implementations of aspects of the present disclosure.
Figure 17:
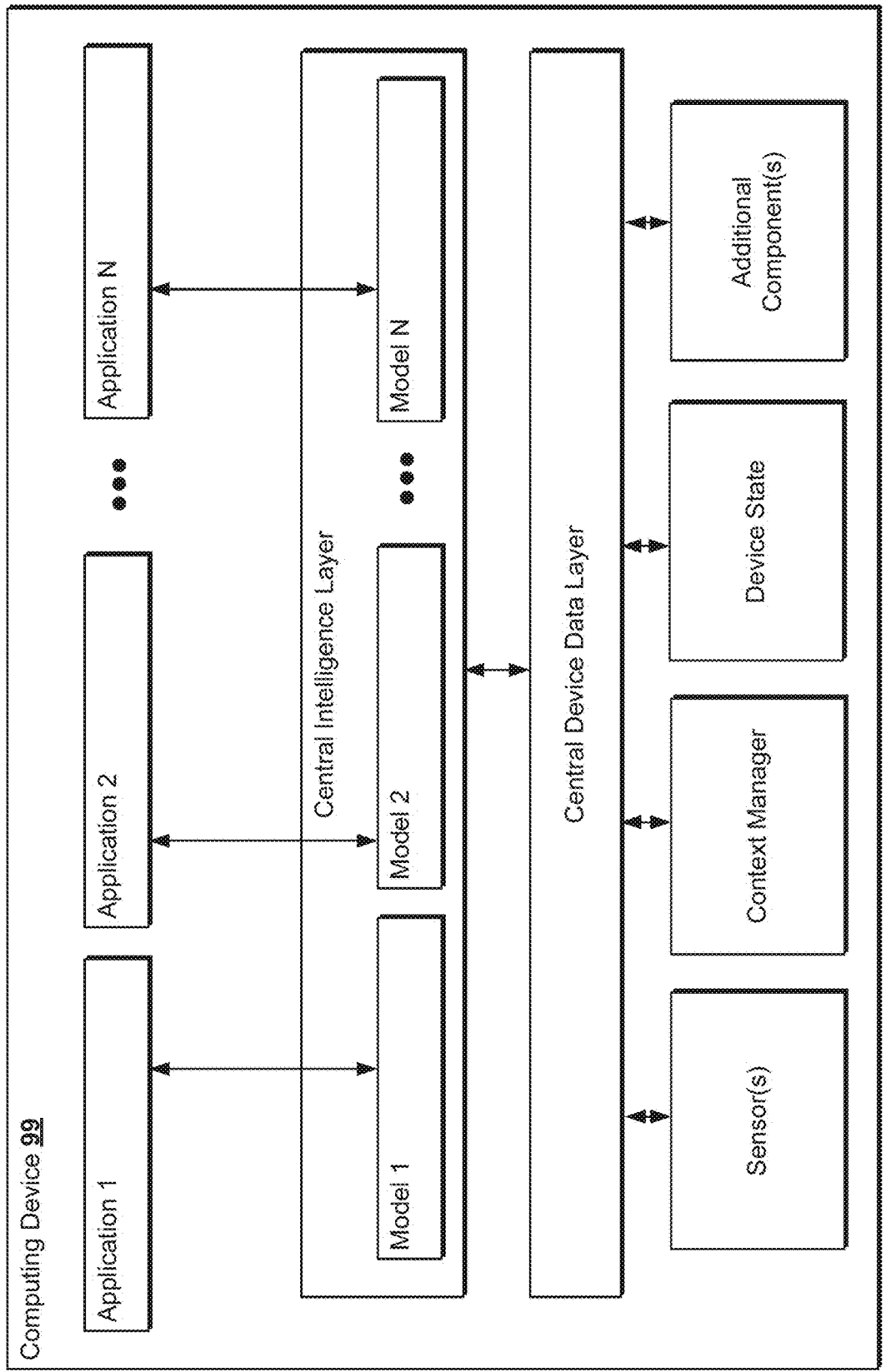
FIG. 17 is a block diagram of an example computing device according to example implementations of aspects of the present disclosure.

FIG. 15 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

FIG. 18 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 24, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

FIG. 19 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 25, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 25, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computing system for generating an artificial intelligence (AI)-generated page for a first organization, comprising:
   one or more processors; and
   one or more non-transitory computer-readable media that collectively store:
   a machine-learned model, wherein the machine-learned model is configured to generate the AI-generated page; and
   instructions that, when executed by the one or more processors, cause the computing system to perform operations, the operations comprising:
      receiving, from a user device associated with a user account, a user query;
      generating a search result page for the user query, the search result page having a first result associated with a first landing page of the first organization;
      calculating a landing page score for the first landing page;
      generating an updated search result page based on the landing page score exceeding a threshold value, the updated search result page having a navigation link to an AI-generated page for the first organization; and
      causing a presentation, on a display of the user device, the updated search result page.

2. The computing system of claim 1, the operations further comprising:
   receiving, from the user device, an indication to view the AI-generated page for the first organization;
   obtaining contextual information associated with the user account, the contextual information including a previous query;
   processing the user query and the contextual information, using the machine-learned model, to generate the AI-generated page; and
   causing a presentation, on the display of the user account, the AI-generated page.

3. The computing system of claim 1, wherein the AI-generated page includes a call-to-action button to a product page of a product associated with the first organization.

4. The computing system of claim 1, wherein the AI-generated page includes a product feed that provides an overview of a product associated with the first organization.

5. The computing system of claim 1, wherein the AI-generated page includes an AI chatbot.

6. The computing system of claim 1, wherein each component of the AI-generated page is annotated with dynamically generated content based on the user query.

7. The computing system of claim 1, wherein the landing page score is determined based on a conversion rate associated with the first landing page.

8. The computing system of claim 1, wherein the landing page score is determined based on a bounce rate of the first landing page.

9. The computing system of claim 1, wherein the landing page score is determined based on a click-through rate.

10. The computing system of claim 1, wherein the landing page score is determined based on a qualitative factor, the qualitative factor being page design quality or content quality.

11. The computing system of claim 1, wherein the updated search result page includes a personalized headline, suggested filters, and suggested clusters.

12. The computing system of claim 1, wherein the navigation link is included in a sponsored content item.

13. The computing system of claim 1, wherein the landing page score exceeds a threshold value when the first landing page does not have a filter for products.

14. The computing system of claim 1, wherein the AI-generated page includes information about a previous query.

15. The computing system of claim 1, wherein the AI-generated page includes a sitelink to a product detail page.

16. The computing system of claim 1, wherein the landing page score is calculated based on performance metrics of the landing page.

17. The computing system of claim 1, wherein the landing page score is calculated based on content quality and design of the first landing page.

18. A computer-implemented method for generating an artificial intelligence (AI)-generated page for a first organization, the method comprising:
   receiving, from a user device associated with a user account, the user query;
   generating a search result page for the user query, the search result page having a first result associated with a first landing page of the first organization;
   calculating a landing page score for the first landing page;
   generating, using a machine-learned model, an updated search result page based on the landing page score exceeding a threshold value, the updated search result page having a navigation link to an AI-generated page for the first organization; and
   causing a presentation, on a display of the user device, the updated search result page.

19. The method of claim 18, further comprising:
receiving, from the user device, an indication to view the AI-generated page for the first organization;
obtaining contextual information associated with the user account, the contextual information including a previous query;
processing the user query and the contextual information, using the machine-learned model, to generate the AI-generated page;
causing a presentation, on the display of the user account, the AI-generated page.

20. One or more non-transitory computer-readable media that collectively instructions that, when executed by the one or more processors, cause a computing system to perform operations, the operations comprising:
receiving, from a user device associated with a user account, the user query;
generating a search result page for the user query, the search result page having a first result associated with a first landing page of a first organization;
calculating a landing page score for the first landing page;
generating an updated search result page based on the landing page score exceeding a threshold value, the updated search result page having a navigation link to an AI-generated page for the first organization; and
causing a presentation, on a display of the user device, the updated search result page.

* * * * *